T. A. WILSON.
Washing-Machine.
No. 207,232. Patented Aug. 20, 1878.
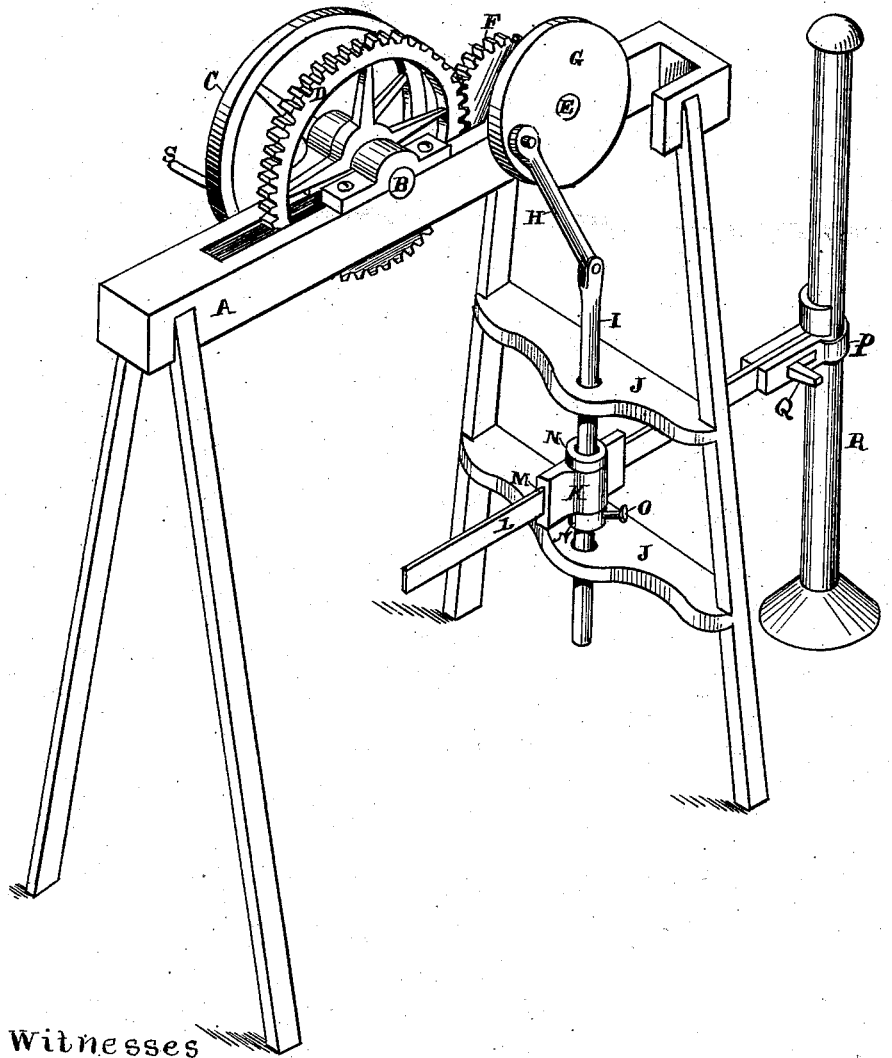
Witnesses
Geo. H. Strong
Frank A. Brooks
Inventor
Toliver A Wilson
by Dewey & Co
Attys.

UNITED STATES PATENT OFFICE.

TOLIVER A. WILSON, OF SAN FRANCISCO, CALIFORNIA.

IMPROVEMENT IN WASHING-MACHINES.

Specification forming part of Letters Patent No. 207,232, dated August 20, 1878; application filed June 7, 1878.

*To all whom it may concern:*

Be it known that I, TOLIVER A. WILSON, of the city and county of San Francisco, and State of California, have invented an Adjustable Driving Attachment for Washing-Machines; and I do hereby declare the following to be a full, clear, and exact description thereof, reference being had to the accompanying drawings.

My invention relates to an apparatus for operating a clothes-pounder or washing-machine, and it is especially applicable to a device patented April 22, 1873, by David W. Rawson, the right to use which I have purchased from the inventor. This washing-pounder has an arrangement of air-passages and valved handle to facilitate its action and render the operation of washing more rapid and thorough. It is found in practice, however, that, although the device is very efficient for the purpose intended, it is tiresome and laborious to operate.

The object of my invention is to provide an operating mechanism for this pounder; and it consists of an arrangement of spur-wheel, pinion, and crank-shaft, operated by a handle, which gives a vertical motion to a pitman, on which is secured an operating-bar carrying the pounder on its outer end. This bar is so secured to the pitman as to have a motion about it, and is capable of adjustment laterally, longitudinally, or vertically.

Referring to the accompanying drawings, the figure is a perspective view of the device.

Let A represent the frame on which the operating mechanism is mounted. In the center of the upper part of the frame is an axle or shaft, B, carrying the fly-wheel C and spur-wheel D, the latter being placed between the two parts of the frame, as shown.

On the end of the frame A is mounted, on suitable bearings, the shaft E, carrying the pinion F, which engages with the spur-wheel D. On this same shaft E, on the outer side of the frame, is the crank-wheel G, having a crank-pin and crank, H, to which is attached the pitman I. The crank H is attached to the pitman I in such a manner as to allow the pitman I free play as the crank-wheel revolves, while at the same time the pitman has only a vertical motion, as shown. Guides J serve to keep the pitman in a direct vertical line.

On the pitman I, between the guides J, is a hanging box, K, having its sides extended, as shown, so as to form a support for the operating-bar L. This support has horizontal dovetailed guides M on its side, into which the dovetailed operating-bar L slides, thus admitting of the operating-bar being moved in toward the frame or out away from it, as desired, and giving it a general horizontal adjustment, while at the same time it is always held in a horizontal position. Collars N above and below the box K keep it on the pitman and allow it at the same time a rotary motion on the shaft. A set-screw, O, on the lower collar permits of the adjustment of the collar on which the box K rests, so that the box can be raised or lowered at will, thus adjusting the height of the operating-bar L. On the outer end of the operating-bar is secured, by means of a strap, P, and key Q, the clothes-pounder or washing-machine R.

Now, by turning the crank or handle S on the fly-wheel C, the spur-wheel, the pinion, and crank-wheel are rotated, thus giving a vertical motion to the pitman I. The box forming the support to the operating-bar, being secured, as herein described, to said pitman, is moved up and down, carrying with it the operating-bar and clothes-pounder.

It will be seen from this that the labor of operating the clothes-pounder is very materially decreased, and that a very rapid motion can be attained with slight expenditure of power.

The method of construction admits of regulating the height of the operating-bar, and the clothes-pounder may be moved back and forth from the frame without having to be disconnected in any manner.

The real point and advantage of my device is in the employment of the horizontal bar connecting with the pitman and the pounder, and having the collars by which the pounder may be adjusted to suit the relative heights of the driving-machine and the clothes-tub, and also in its ready adjustment in a horizontal plane, so that the pounder may be moved all around the clothes-tub and operate on every portion without stopping its vertical movement.

Having thus described my invention, what I claim as new, and desire to secure by Letters Patent, is—

The crank-wheel G, pitman H, operating-rod I, box K, provided with collars N, and adjusting-bar L, in combination with collar P, key Q, and washing-pounder R, as and for the purpose set forth.

In witness whereof I have hereunto set my hand.

TOLIVER A. WILSON.

Witnesses:
GEO. H. STRONG,
FRANK A. BROOKS.